March 22, 1966  J. R. JOHNSON  3,241,518
BANDING APPARATUS FOR MANUFACTURE OF PLASTIC
COATED CONTAINERS
Filed May 8, 1961  2 Sheets-Sheet 1
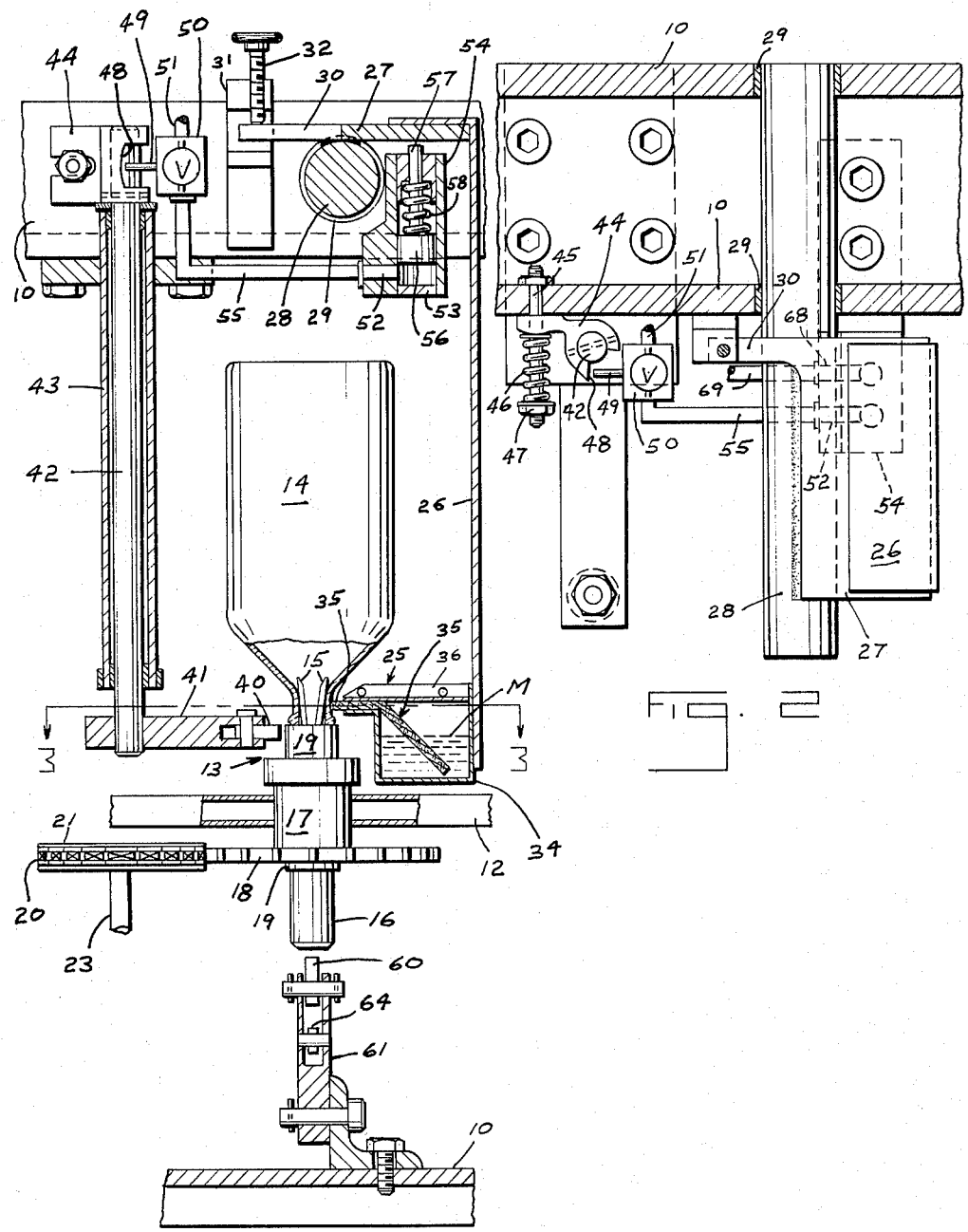
INVENTOR.
JOHN R. JOHNSON
BY J. R. Nelson &
W. A. Schaich
ATTORNEYS

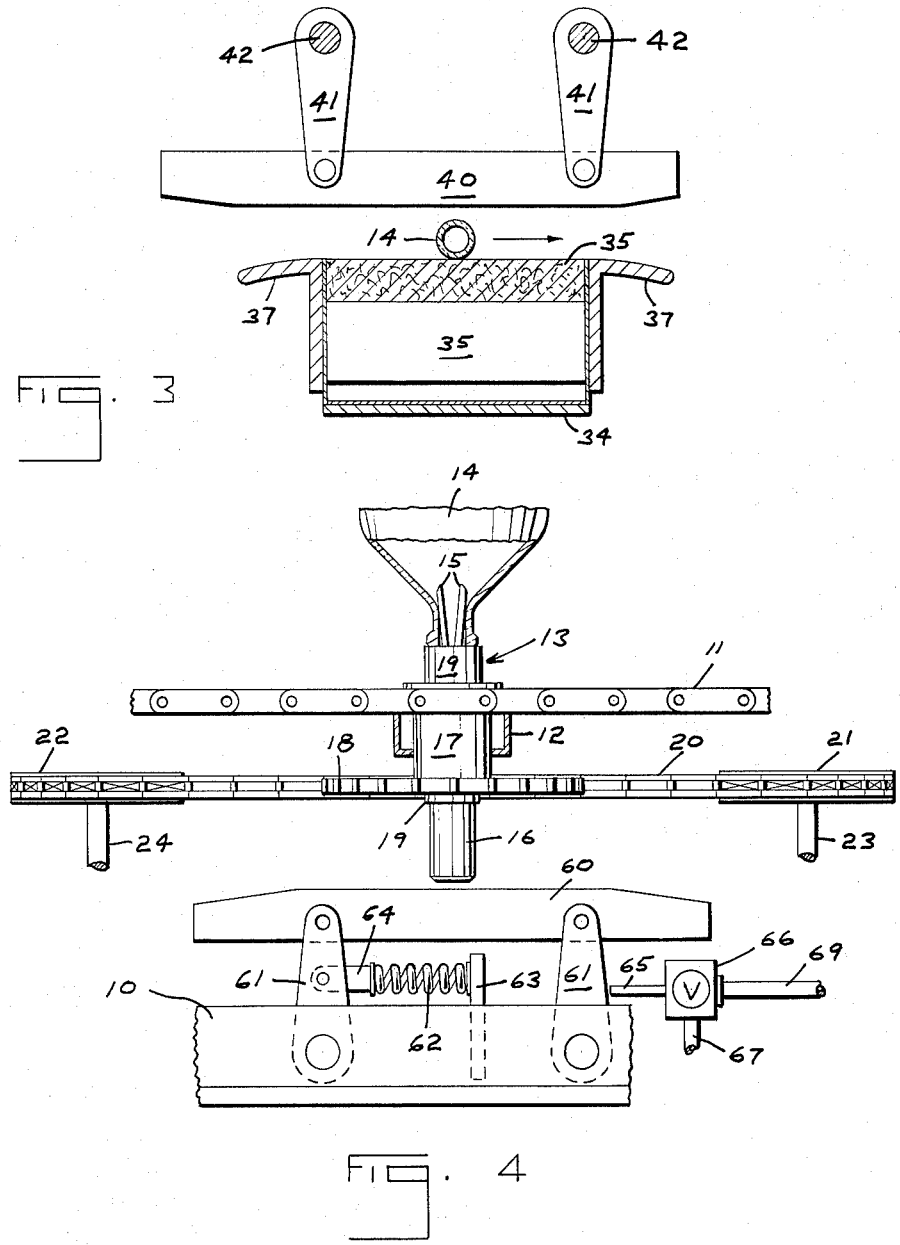

United States Patent Office 3,241,518
Patented Mar. 22, 1966

3,241,518
BANDING APPARATUS FOR MANUFACTURE OF PLASTIC COATED CONTAINERS
John R. Johnson, Toledo, Ohio, assignor to Owens-Illinois Glass Company, a corporation of Ohio
Filed May 8, 1961, Ser. No. 108,357
5 Claims. (Cl. 118—7)

This invention relates to apparatus for providing an annular coating of a masking or barrier composition on the virgin glass surface of a container in the manufacturing process for producing a plastic coated container, wherein the container is treated prior to the application of the plastic so that the plastic will be tenaciously bonded to the glass; the annular coated area providing a segment of the plastic coating that has a freely overlying relationship to the glass container and the remainder of the plastic coating bonded to the glass surface of the container.

Glass containers coated with plastic have recently been adopted commercially for dispensing-type packages known as "glass aerosol" containers. The glass container itself being generally recognized as a fragil material, is strengthened and cushioned by the protective plastic coating which alleviates the fragil characteristic of the package. Merely coating this container with plastic and filling the container with fluid under pressure comprises one form of glass aerosol package being produced. Another improved form of glass aerosol package consists of a glass container that is first treated with a bonding material, often referred to as a primer, that will thereafter tenaciously adhere the plastic covering to the glass. Thus, if the glass wall of the container should fracture, the danger of loose glass particles having the potential of flying projectile fragments is eliminated.

In conjunction with the production of glass aerosol packages, it has been found that the greatest frequency of fractures of the container occurs during the final assembly of the aerosol dispensing valve on the neck finish of the coated and filled container. These fractures occur in nearly every case in the region adjacent the neck and shoulder of the container. In the latter-mentioned improved type of glass aerosol package, wherein the plastic covering is bonded to the glass, such a fracture may go undetected and the weakened package delivered to the hands of a user. To overcome this hazard, the packages are produced such that in applying the bonding material onto the glass to cause the tenacious adherence of the subsequently applied plastic covering, an unbonded annular region is provided in the critical region where the majority of the failures occur. In this unbonded area, the plastic will then be separable from the glass. Should a fracture occur in fabricating the package, the pressurized contents of the bottle may leak through the fracture and into the unbonded region under the plastic covering causing the latter to bulge by inflation.

The present invention has for one of its objects pretreating the glass container in the manufacturing process by applying a band of a liquid form of a masking or barrier material on a preselected area of the container so that in this area the bonding material will be rendered ineffective for bonding the plastic to the glass. This application of the masking material is done during the continuous movement of the container and the coated container is produced in the process such that it is pretreated, the bonding coating applied and the final plastic coating applied and set during continuous movement of the container and in an uninterrupted cycle.

A further object of the invention is to provide a novel apparatus for applying the liquid masking material by combined rotary and linear movement of the container past a stationary, elongated, applicator that is mounted in the path of travel of the container. The applicator is constructed and arranged such that a desired preselected surface area is treated with the liquid masking material to form the mentioned barrier for the latter applied bonding material.

In the apparatus just mentioned, provision is also made to prevent interference between the applicator and the moving parts of the equipment which bring the bottle to and through the treating station. This interference is prone to arise when no bottle is presented to the treating station by the carriage. Should an interference with the machine parts occur, a contamination of the applicator and damage thereto by its engagement with the moving parts of the equipment will result. To outline this interference problem more completely, the bottle is loaded onto a chuck on the machine carriage and is driven continuously for carrying the bottle throughout the entire cycle for production of the plastic coated container. The chucks operate by having expansible jaws that grip and hold the container internally at its neck and thereby carry it for treatment through at least two dipping tanks which contain the liquid bonding or primer composition and liquid plastic coating composition. These two liquid compositions are corrosive in nature to machinery parts and are capable of setting to a solid or gummy state and thereby cause a malfunction of the mechanical elements of the chuck. It is necessary, therefore, that the jaws and other related moving parts of the chuck be covered by caps or covers to prevent any exposure and contact in their run through the dip tanks with the two mentioned liquid compositions.

It is another object of the invention to provide a novel applicator apparatus, as mentioned, which assures no contamination or damage to the applicator element.

It is a further object of the invention to provide an applicator for accomplishing the foregoing treatment of containers as they are brought to a treating station, and yet by manipulating the applicator to a coating position in response to a container being presented at the treating station by the chucks and automatically manipulating the applicator away from the coating position if no container is presented at the treating station; and, thus, eliminate potential contamination of the applicator element through any interference with or contact on the carriage parts at the treating station.

The specific nature of this invention, as well as other objects and advantages thereof, will become apparent to those skilled in the art from the following detailed description, taken in conjunction with the annexed sheets of drawings, on which, by way of preferred example only, is illustrated a preferred embodiment of this invention.

In the drawings:

FIG. 1 is a sectional front elevational view of the apparatus of the invention shown in operation at the treating station applying an annular band of barrier coating composition to a selected annular area on the neck region of glass container;

FIG. 2 is a plan view of the apparatus of FIG. 1 and is shown partly in section;

FIG. 3 is a sectional plan view taken along line 3—3 of FIG. 1; and

FIG. 4 is a side elevational view, partly in section and partly schematic, showing a control feature of the applicator apparatus at the treating station.

Since one of the primary uses of this invention is in the production of plastic coated glass bottles of a particular type from which an improved glass aerosol package may be made, it will be particularly described in that connection.

In the present invention, desired plastic coated containers are continuously produced by the hereinafter outlined sequence of operations. As outlined in my copending application Ser. No. 835,360, filed August 21, 1959, now abandoned, the machine for producing these coated containers comprises a carriage which runs endlessly through a bottle loading zone whereat the bottles are securely held by chucks. The bottles are then brought in succession to a priming tank wherein they are dipped into a liquid bonding composition. This material is applied over the exterior surface of the bottle for bonding a latter applied liquid plastic coating to the glass. In this invention, however, the carriage is arranged to travel through a pretreating station whereat the apparatus of the present invention is mounted and the annular band of a barrier or masking material is applied to a selected surface area of the bottle prior to dipping it in the bath of the bonding composition.

Referring to the drawings, as seen on FIG. 1, the machine includes a machine frame 10, of which only fragments are shown. This machine includes the movable carriage that comprises two similar spaced apart chains 11, one of which is shown on FIG. 4. The chains have a number of similar spaced apart cross-members 12 that move with the carriage. One of these cross-members is shown broken away on FIG. 1. The chains 11 are reeved and guided in an endless path throughout the machine to carry the members 12 continuously throughout a cycle, which is repeated successively for producing plastic coated containers in quantity. Each member 12 is provided with means for holding a container, as shown by the chuck 13 holding a bottle 14 internally at its neck end. In holding the bottle, the expansible jaws 15 of the chuck are inserted in the neck of the bottle by placing the open neck end thereover while the jaws are contracted. Jaws 15 are spring loaded for a normal radially actuated expansion. A plunger element 16 is connected at one end to actuate jaws 15. The other end of element 16 extends to the opposite side of the carriage member 12. The plunger is extended away from the jaw of the chuck by spring force and is shiftable toward the jaws 15 to overcome the spring loading and force the chuck to contract. This movement of the element 16 in the direction toward the jaws 15 is for the purpose of loading and unloading a bottle 14 on the chuck. The chuck 13 is shown holding a bottle 14 and is constructed and supported so as to be rotatable about the central axis of bottle 14. The chucks have a journal member 17 affixed to the cross-member 12 and a gear 18 is fastened onto a concentric internal rotatable body element 19 which carries the chuck jaws 15. The body member 19 concentrically houses the outwardly extending plunger element 16. The bottles 14, when loaded to the chucks, extend perpendicular to the cross-members 12.

As the bottles 14 are conveyed through the treating station, as shown on FIGS. 1 and 3, the gear 18 of the chuck is brought into mesh with the links of a chain 20. The chain is connected to run endlessly about spaced sprockets 21 and 22 which are rotatable on their responsive shafts 23 and 24. Either of the shafts 23 or 24 is connected to a suitable drive means (not shown), such as variable speed electric motor drive, for driving the chain 20. The near side reach of the chain 20 (FIGS. 1 and 4) is substantially tangent with the pitch diameter of the gear 18 as it is brought through the treating station. The drive for the chain 20 is adjustable to a speed such that it will move with respect to the sprocket at a rate faster than the sprocket is moving in the treating station. As will be apparent from the description hereinafter of the applicator, the chain 20 will need to impart at least one complete revolution to the gear 18 during the span of movement of the chuck 13 for moving the container the length of the applicator.

As best shown on FIGS. 1 and 3, an applicator assembly 25 is mounted on a cantilever bracket 26 that depends from a bearing plate 27. The bearing plate 27 is welded to a shaft 28. The shaft 28 is mounted for rotation in the spaced bearings 29 in the frame 10. The left-hand end of the bearing plate 27 is contoured to an end projection 30 which extends under a horizontal bracket 31 attached to the frame 10. The bracket 31 is provided with an adjustable stop member, as set screw 32, which is threaded through the bracket 31 and normally in contact with the end of the end projection 30. Cantilever arm 26 is thus provided a pivotal mounting on the shaft 28 and is adjusted to hang at a coating position for the applicator 25 against the bottle 14 by the stop means at 31, 32. At the lower end of the arm 26 is attached the reservoir 34 which contains the liquid barrier composition, indicated as M. Clamped in place at 36 on the upper and outer lip of the reservoir is an applicator element 35. This element is made of a wick-like material which is in contact with the composition M in the reservoir and extends out over the edge clamp of the reservoir to project horizontally for contact with the container surface. The horizontally projecting portion of applicator element 35 is elongated, as shown on FIG. 3. The thickness of applicator element 35 will depend upon the width of band desired to be applied on container 14. As seen on FIG. 3, the forward and rear sides of the applicator element 35 are protected by the divergent guide plates 37 fastened to the vertical side walls of the reservoir 34. As a preferred example, the applicator element 35 may be constructed of Dacron, felt material. This material possesses satisfactory absorbency and durability for the intended use. Many other suitable materials may be selected.

Thus, the applicator unit 25 is cantilever mounted and adjusted to a coating position by the adjustable stop 32. As explained previously herein, the machine parts of the chuck, if a bottle should be absent therefrom, may present interference problems with the applicator at its coating position. Therefore, this invention also provides a mechanism for swinging the applicator unit away from coating position if a container is missing so as to prevent interfering contact between the applicator element 35 and the machine parts of the chuck. In some instances, the chuck may pass through the machine with a metal cap (not shown) covering the jaws 15. This cap is held onto the chuck by the jaws in a similar manner as in gripping and holding container 14 and has an outer diameter equal to or greater than the neck end portion of container 14. If such is the case, the cap will engage a cam 40 that is shiftably mounted on pivot arms 41 which are suspended by vertical shafts 42. Each of these shafts 42 are rotatably mounted in a bearing structure 43 fastened to the upper frame 10. As seen on FIG. 2, one of the shafts 42 has a dog member 44 keyed on its end for rotation with the shaft. The outer end of dog 44 is yoke shaped to fit around horizontally extending bolt 45 fastened to frame 10. A spring 46 is compressed between the end of dog 44 and nut 47 on the shaft 45. This spring 46 normally maintains the shafts 42 and the cam 40 in the horizontally extended position, as shown on FIG. 3. If an interference should exist, such as by a cap being present on the chuck 15, the cap will shift the cam 40 in the direction of movement of the chuck (to the right of FIG. 3). This movement will cause shafts 42 to rotate in a counterclockwise direction on FIG. 2 and turn dog 44 against the force of spring 46 to further compress it. Dog 44 also has a contoured annular portion that forms a shoulder 48 opposite valve actuator 49. The valve actuator 49 is connected to operate a normally closed fluid valve 50. The valve 50 is connected by conduit 51 to a source of fluid under pressure (not shown). The other side of valve 50 is connected to lower inlet port 52 of cylinder 53 of cylinder piston motor 54. The connection between valve 50 and motor 54 is by conduit 55. Motor 54 includes a piston 56 that has an upwardly extending driver element 57 engageable with the underside of the pressure plate 27 of the cantilever arm mounting for the applicator unit. Spring 58 is compressed between the end of cylinder 53 and piston 56 to retain the piston and driver element 57 normally retracted. As cam 40 is shifted to rotate the shaft 42 and the dog 44, the shoulder 48 depresses valve actuator 49 which opens valve 50 thereby connecting motor 54 with the source of pressure fluid. This provides a switch means for controlling motor 54. At the time motor 54 is activated by valve 50, driver element 57 extends and contacts bearing plate 27, thereby rotating cantilever arm 26 and the applicator unit counterclockwise on its pivot (see FIG. 1). This action causes the applicator unit to be moved away from coating position to prevent any interference between the machine elements on the carriage and the applicator element 35. After the interfering part has gone beyond cam element 40, the spring loading at 46 will drive dog 44 and shaft 42 to restore cam 40 to its normal position. Dog 44 will also release valve actuator 49. This again cuts off the source of fluid to motor 54 and its spring 58 will restore the driver element 57 to the depressed position allowing the applicator unit 25 by its own weight to move to the coating position.

As an additional precaution, a further safety is provided to prevent interference between the chuck jaws and the applicator element 35. This latter intereference may occur if no bottle or cap is on the chuck. In the event that the chuck is empty, its plunger 16 will extend outwardly its greatest distance from jaws 15. At this extended position, element 16 will engage an underside cam 60, as shown on FIG. 4. Chuck 13 will be moving from left to right on FIG. 4 and cam 60 will shift as plunger 16 is moved in the right-hand direction. Cam 60 is mounted on two upright links 61 which are pivotally connected at their opposite ends to a horizontal section of frame 10. Cam 60 is maintained normally in the position shown on FIG. 4 by spring 62 compressed between a rigid standard 63 and pivotal bracket connection 64 connected to the left-hand upright link 61. The right-hand link 61 is aligned with valve actuator 65 of valve 66. Valve 66 is normally closed. It is connected to the source of pressure fluid by pipe 67 and also connected to inlet port 68 of the motor cylinder 53 by pipe 69. Thus, as cam 60 is shifted in the right-hand direction on FIG. 4, valve 66 will connect lines 67 and 69 to activate motor 54 and extend driving element 57. This will swing the applicator unit 25 out of its coating position similarly as was described above.

As an example of the materials involved in the various coatings applied to the glass container herein, the first treatment applied to the bottle in the form of an annular band is the composition M. This composition constitutes a barrier material which may be employed with the bonding composition given hereinafter, and comprises a mixture of a thickened emulsion of polyethylene prepared by mixing polyethylene with potassium hydroxide and oleic acid, and thickened by the addition of an aqueous solution of a sodium salt of polyacrylic acid. The emulsion is prepared to the proper viscosity for suitable application through the use of the particular applicator element being employed.

The bonding composition in this example is a primer composition comprising a mixture containing gamma-amino propyltriethoxy silane, epoxy resin, methyl methacrylate polymer and organic solvents.

The plastic coating composition in the present example is a plastisol comprised of a polyvinyl chloride, diisooctyl phthalate and tin mercaptide, plus desired pigmenting ingredients.

Thus in the operation of the machine described generally above, a continuous process for the manufacture of a plastic coated bottle, jar or like container is provided wherein a coating on the container is applied such that a major portion of the plastic is bonded to the glass and a remaining annular portion is freely overlying the surface of the glass container. The container is first attached to the carriage and moved in a defined linear path through a treating station with the axis of the container perpendicular to the direction of movement. The container is also rotated about its axis during this linear movement. A liquid emulsion of an organic barrier agent is wiped over a preselected surface area of the container as it is being moved and rotated. This applies a coating of the barrier composition M to the exterior of the glass article in the selected annular region. Subsequently the container is moved through a bath of the liquid bonding composition and the entire exterior surface of the container is coated. Thereafter, the container is moved through a bath of the liquid plastic composition and the plastic covering is formed on the container to complete the container portion of the glass aerosol package. In the use of this invention, the final glass aerosol package will have a plastic sheath that includes a freely overlying portion in the annular region whereat the barrier composition was applied, and the remainder of the covering will be tenaciously bonded to the surface of the container.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. In apparatus for applying an annular band of coating material on a cylindrical container, a carriage traveling in a defined path through a treating station, a chuck mounted on the carriage and operated for holding a container, an applicator operable for applying a coating material upon engagement with the container, means mounting the applicator in stationary coating position at the treating station for engaging the container surface of preselected diameter as the latter is moved through said station to apply a band of the coating material thereon, said means comprising a frame at said station, a cantilever arm attached to said applicator, a pivot support for said arm on the frame, stop means yieldably retaining the arm and applicator in said coating position, switch means mounted on the frame in advance of said applicator and engageable by an object on said chuck of greater diameter than said select diameter of the container, motor means on said frame and adapted, when operated, to pivot said arm and applicator away from coating position, and control means connected with said switch means for operating said motor means responsive to engagement by said object of excessive diameter.

2. The apparatus of claim 1, wherein the stop means comprises a stop member adjustably mounted on the frame in the plane of the cantilever arm and in the path of its pivotal movement and engaging said arm to the define the coating position for the applicator, said stop member being adjustable on its mounting thereby providing for an adjustment of the coating position of the applicator.

3. In apparatus for applying an annualar band of coating material on a cylindrical container, a carriage traveling in defined path through a treating station, a chuck mounted on the carriage and operated for holding a container, an applicator operable for applying a coating material upon engagement with the container, means mounting the applicator in stationary coating position at the treating station for engaging the container surface of preselected diameter as the latter is moved through said station to apply a band of the coating material thereon, said means comprising a frame at said station, a cantilever arm attached to said applicator, a pivot support for said arm on the frame, stop means yieldably retaining the arm and applicator in said coating position, a cam, a horizontally yieldable bracket mounting said cam on the frame in advance of said applicator so that it is engageable by an object on said chuck of greater diameter than said select diameter of the container, a valve, a valve actuator connected to said bracket and engageable with the valve to operate it by yieldable movement of the cam responsive to engagement by said object of excessive diameter, a fluid-operated cylinder motor mounted on said frame, said motor including a drive element adapted, when activated, to pivot said arm and applicator away from coating position, the motor being normally inactivated, and a source of fluid under pressure connected through said valve to said motor, whereby the motor is activated responsive to operation of said valve.

4. In apparatus for applying an annular band of coating material on a cylindrical container, a carriage traveling in defined path through a treating station, a chuck mounted on the carriage including an outwardly extending reciprocable element operating the chuck for gripping a container, said element extending a distance when a container is gripped by the chuck and extending the greatest distance when the chuck is operated and a container is absent, an applicator operable for applying a coating material upon engagement with the container, means mounting the applicator in stationary coating position at the treating station for engaging the container surface of preselected diameter as the latter is moved through said station to apply a band of the coating material thereon, said means comprising a frame at said station, a cantilever arm attached to said applicator, a pivot support for said arm on the frame, stop means yieldably retaining the arm and applicator in said coating position, switch means mounted on the frame in advance of said applicator in the path of said element as it and its chuck are moved by the carriage and engageable by said element whenever the latter is outwardly extended its greatest distance on said chuck, motor means on said frame and adapted, when operated, to pivot said arm and applicator away from coating position, and control means connected with said switch means for operating said motor means responsive to engagement by said element.

5. The apparatus of claim 4, wherein the switch means comprises a yieldable cam member engageable and the motor means comprises a fluid-operated cylinder motor including a driver element for contacting the cantilever arm to pivot it away from coating position, a source of fluid under pressure, a fluid connection from the source to the motor, a motor control valve connected in said fluid connection, and a valve actuator operated responsive to yielding movement of said cam for operating the motor control valve and causing the motor to pivot said arm and applicator away from coating position.

References Cited by the Examiner
UNITED STATES PATENTS

| | | | |
|---|---|---|---|
| 2,210,187 | 8/1940 | Ross | 117—94 XR |
| 2,244,651 | 6/1941 | Goebel et al. | |
| 2,284,366 | 5/1942 | Bryant | 118—232 |
| 2,287,356 | 6/1942 | Newman. | |
| 2,367,722 | 1/1945 | Guthrie | 117—43 |
| 2,380,212 | 7/1945 | Blaisdell | 118—232 |
| 2,505,063 | 4/1950 | Palermo. | |
| 2,755,507 | 7/1956 | Heller | 118—432 XR |
| 2,924,534 | 2/1960 | Morse | 117—5.5 |
| 2,981,639 | 4/1961 | Kachele | 117—113 |
| 2,991,188 | 7/1961 | Wing et al. | 117—5.5 |
| 3,028,260 | 4/1962 | McKee | 117—94 |

WILLIAM D. MARTIN, *Primary Examiner.*

MURRAY KATZ, RICHARD D. NEVIUS, *Examiners.*